US008055309B2

(12) United States Patent
Wai

(10) Patent No.: US 8,055,309 B2
(45) Date of Patent: Nov. 8, 2011

(54) METHOD AND DEVICE FOR ACTIVATING A MEDIA PLAYER

(75) Inventor: Chan Wai, Singapore (SG)

(73) Assignee: Motorola Mobility, Inc., Libertyville, IL (US)

( * ) Notice: Subject to any disclaimer, the term of this patent is extended or adjusted under 35 U.S.C. 154(b) by 121 days.

(21) Appl. No.: 11/549,863

(22) Filed: Oct. 16, 2006

(65) Prior Publication Data
US 2008/0090534 A1    Apr. 17, 2008

(51) Int. Cl.
*H04M 1/00*    (2006.01)
(52) U.S. Cl. .................. 455/569.2; 455/414.1; 455/149; 455/577; 381/315; 381/314; 381/309
(58) Field of Classification Search .................. 455/3.01, 455/550.1, 569.1, 575.2, 577, 414.1, 149, 455/350, 550.2, 569.2; 381/315, 314, 309
See application file for complete search history.

(56) References Cited

U.S. PATENT DOCUMENTS

2002/0068610 A1*    6/2002    Anvekar et al. ............... 455/560
2005/0097595 A1*    5/2005    Lipsanen et al. ................ 725/25

OTHER PUBLICATIONS

Applicant Admited Prior Art in Specification.*

\* cited by examiner

*Primary Examiner* — Nick Corsaro
*Assistant Examiner* — Quan Hua

(57) ABSTRACT

A method and device for activating a media player enables efficient and convenient access to media files. The method includes determining that a wireless communication device (100) is not operatively coupled to a network. An operative coupling of a speaker system (205) to the wireless communication device (100) is detected. The media player is then activated automatically in response to detecting the operative coupling of the speaker system (205) to the wireless communication device (100).

12 Claims, 3 Drawing Sheets

METHOD AND DEVICE FOR ACTIVATING A MEDIA PLAYER

FIELD OF THE INVENTION

The present invention relates generally to wireless communication devices, and in particular to multi-function wireless communication devices that include media players.

BACKGROUND

Users continually seek increased functionality from portable electronic devices. Further, it is often desirable to integrate the capabilities and functionality of different portable devices into a single portable device, so as to eliminate the need to carry multiple devices. From a user's perspective, eliminating the need to carry multiple devices provides a significant advantage because carrying multiple devices can be cumbersome. Additional advantages that can be realized by integrating the capabilities of multiple devices into a single device include reducing costs by eliminating the need to purchase multiple devices, as well as eliminating the need to purchase and maintain separate batteries and accessories for multiple devices.

Mobile telephones are increasingly multi-function devices that can include, in addition to wireless telephony services, functions and applications commonly associated with digital music players, personal digital assistants, notebook computers, and various other devices. For example, mobile telephones often include applications for media playing, calendaring, personal information management, internet browsing, and processing emails. However, increased functionality often results in more complex devices that are more difficult to operate. For example, some multi-function devices require navigating complex menus or pressing multiple keypad entries to activate specific functions.

According to one aspect, the present invention is a method for activating a media player of a wireless communication device by determining that the wireless communication device is not operatively coupled to a network, detecting an operative coupling of a speaker system to the wireless communication device, and then activating the media player automatically in response to detecting the operative coupling of the speaker system to the wireless communication device.

According to another aspect, the present invention is a method for activating a media player of a wireless communication device by detecting operative coupling of a stereo speaker system to the wireless communication device, and then activating the media player automatically in response to detecting the operative coupling of the stereo speaker system to the wireless communication device.

Embodiments of the present invention therefore enable a media player of a wireless communication device to be activated quickly and with only a single input from a user. Operative coupling of a speaker system to a wireless communication device, such as the single action of plugging in a headset to a mobile telephone, can automatically activate a media player to provide immediate access to audio or video files. Some embodiments of the present invention further avoid delays associated with attaching a wireless communication device to a network during a conventional start up process, by activating a media player in a transmitter off mode, thus further accelerating access to the media player and conserving battery power. Still other embodiments of the present invention distinguish between operative coupling of a stereo speaker system, which may indicate that a user seeks to play an audio or video file using a media player, and operative coupling of a mono speaker system, which may indicate that a user seeks to use a wireless communication mode of a wireless communication device.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
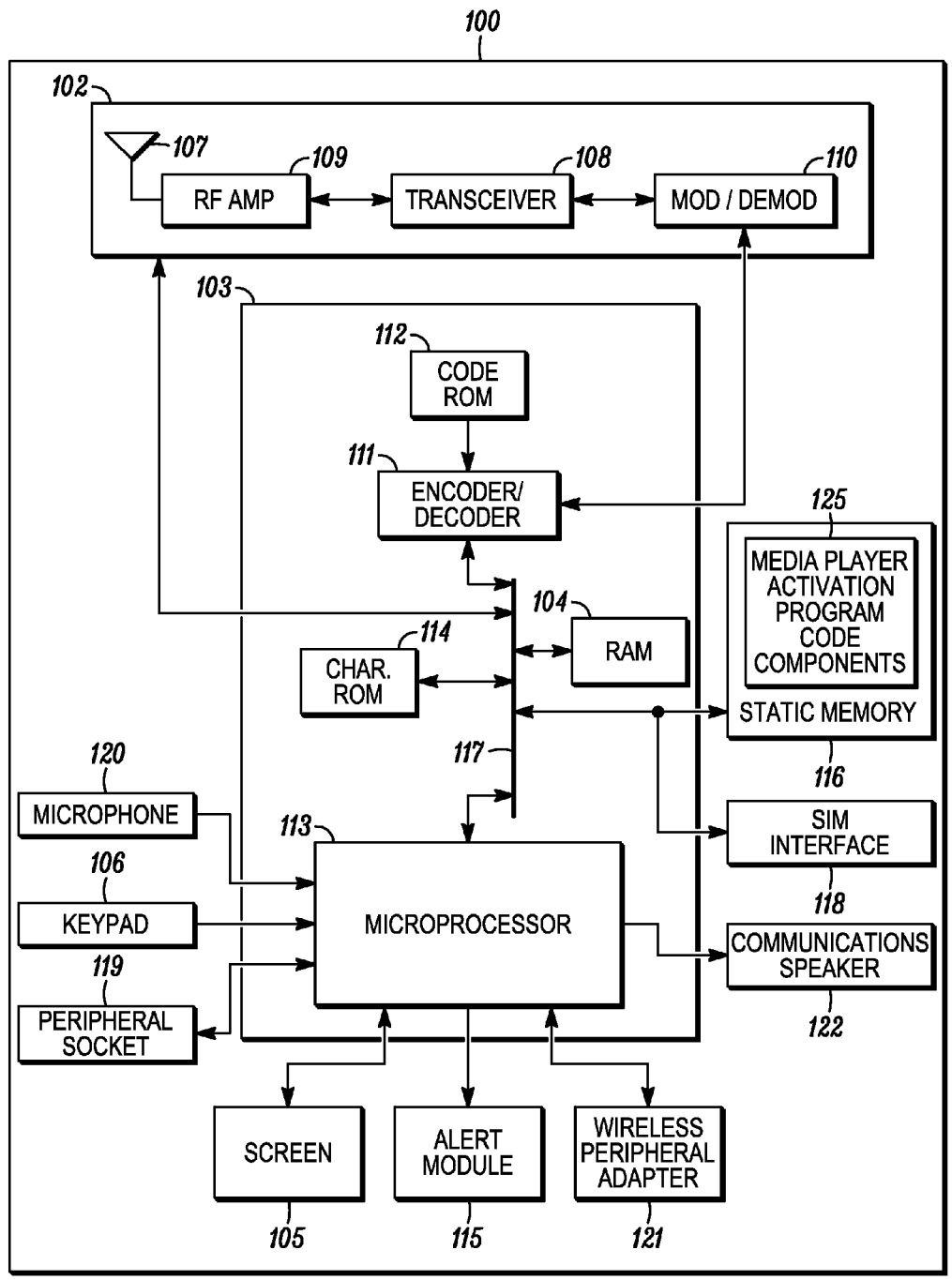
FIG. 1 is a schematic diagram illustrating a multi-function wireless communication device in the form of a mobile telephone, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and device for activating a media player. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a method, or device that comprises a list of elements does not include only those elements but may include other elements not expressly listed or inherent to such a method or device. An element preceded by "comprises a . . . " does not, without more constraints, preclude the existence of additional identical elements in the method or device that comprises the element.

According to one aspect, the present invention is a method for activating a media player of a wireless communication device by determining that the wireless communication device is not operatively coupled to a network, detecting an operative coupling of a speaker system to the wireless communication device, and then activating the media player automatically in response to detecting the operative coupling of the speaker system to the wireless communication device.

According to another aspect, the present invention is a method for activating a media player of a wireless communication device by detecting operative coupling of a stereo speaker system to the wireless communication device, and then activating the media player automatically in response to detecting the operative coupling of the stereo speaker system to the wireless communication device.

Embodiments of the present invention therefore enable a media player of a wireless communication device to be activated quickly and with only a single input from a user. Operative coupling of a speaker system to a wireless communication device, such as the single action of plugging in a headset to a mobile telephone, can automatically activate a media player to provide immediate access to audio or video files. Some embodiments of the present invention further avoid delays associated with attaching a wireless communication device to a network during a conventional start up process, by activating a media player in a transmitter off mode, thus further accelerating access to the media player and conserving battery power. Still other embodiments of the present invention distinguish between operative coupling of a stereo speaker system, which may indicate that a user seeks to play an audio or video file using a media player, and operative coupling of a mono speaker system, which may indicate that a user seeks to use a wireless communication mode of a wireless communication device.

Referring to FIG. 1, a schematic diagram illustrates a multi-function wireless communication device in the form of a mobile telephone 100, according to some embodiments of the present invention. The telephone 100 comprises a radio frequency communications unit 102 coupled to be in communication with a common data and address bus 117 of a processor 103. The telephone 100 also has a keypad 106, a display screen 105, such as a touch screen, and a peripheral socket 119, for peripheral devices such as headsets, coupled to be in communication with the processor 103.

The processor 103 also includes an encoder/decoder 111 with an associated code Read Only Memory (ROM) 112 for storing data for encoding and decoding voice or other signals that may be transmitted or received by the mobile telephone 100. The processor 103 further includes a microprocessor 113 coupled, by the common data and address bus 117, to the encoder/decoder 111, a character Read Only Memory (ROM) 114, a Random Access Memory (RAM) 104, programmable memory 116 and a Subscriber Identity Module (SIM) interface 118. The programmable memory 116 and a SIM operatively coupled to the SIM interface 118 each can store, among other things, selected text messages and a Telephone Number Database (TND) comprising a number field for telephone numbers and a name field for identifiers associated with one of the numbers in the name field.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that is coupled to the encoder/decoder 111.

The microprocessor 113 has ports for coupling to the keypad 106, to the display screen 105, and to the peripheral socket 119. The microprocessor 113 further has ports for coupling to an alert module 115 that typically contains an alert speaker, vibrator motor and associated drivers, to a wireless peripheral adapter 121 such as a Bluetooth® adapter, to a microphone 120 and to a communications speaker 122. The character ROM 114 stores code for decoding or encoding data such as text messages that may be received by the communications unit 102. In some embodiments of the present invention, the character ROM 114, the programmable memory 116, or a SIM also can store operating code (OC) for the microprocessor 113 and code for performing functions associated with the mobile telephone 100. For example, the programmable memory 116 can comprise media player activation computer readable program code components 125 configured to cause execution of a method for activating a media player, according to an embodiment of the present invention. Various methods for activating a media player, according to different embodiments of the present invention, are described in detail below.

It is known in the art to provide a "transmitter off operating mode", sometimes referred to as an "airplane mode", on a multi-function wireless communication device, such as on the mobile telephone 100. Such a transmitter off operating mode disables a transmitter or transceiver of a device while enabling operation of various non-radio frequency (RF) transmission applications. Such non-RF transmission applications include, for example, games, media players, electronic calendars and personal information management applications. Thus such a transmitter off operating mode can be useful in an RF transmission restricted environment, such as on some airplanes, and also can conserve device battery power.

Further, operating a multifunction wireless communication device in a transmitter off operating mode can be convenient in other circumstances. For example, a start up process for a standard operating mode of a wireless communication device such as a mobile telephone can be time consuming, as the telephone is required to activate its transceiver, and then complete boot-up algorithms including authentication, authorization and accounting (AAA) procedures with a local network. Where a user desires to activate an application that does not involve RF transmission, such as a media player application, activating a mobile telephone in a transmitter off operating mode generally can be performed more quickly than activating a standard operating mode because no interactions with a network are required. Such fast access to applications that do not involve RF transmission can be very desirable, such as when a user seeks to quickly check an appointment time in an electronic calendar or quickly access a media file using a media player.

According to some embodiments of the present invention, the time required to activate a media player, such as an audio or video player, of a wireless communication device can be further reduced by detecting operative coupling of a speaker system, such as a headset, to the wireless communication device. For example, concerning the mobile telephone 100, when a headset plug is inserted into the peripheral socket 119, the mobile telephone 100 can detect that the headset has been operatively coupled to the mobile telephone 100, and then automatically activate a media player of the mobile telephone 100. Thus a user is able to begin listening to music or begin watching a video, for example, on the mobile telephone 100 using only the single action of inserting a headset plug into the peripheral socket 119. Whereas, using a conventional mobile telephone as known according to the prior art, to activate a media player a user may be required to wait for many seconds while the telephone first attaches to a network, and further the user is then required to make numerous menu selections from a display screen, such as a main menu selection, an applications menu selection, and then a media player selection.

Figure 2:
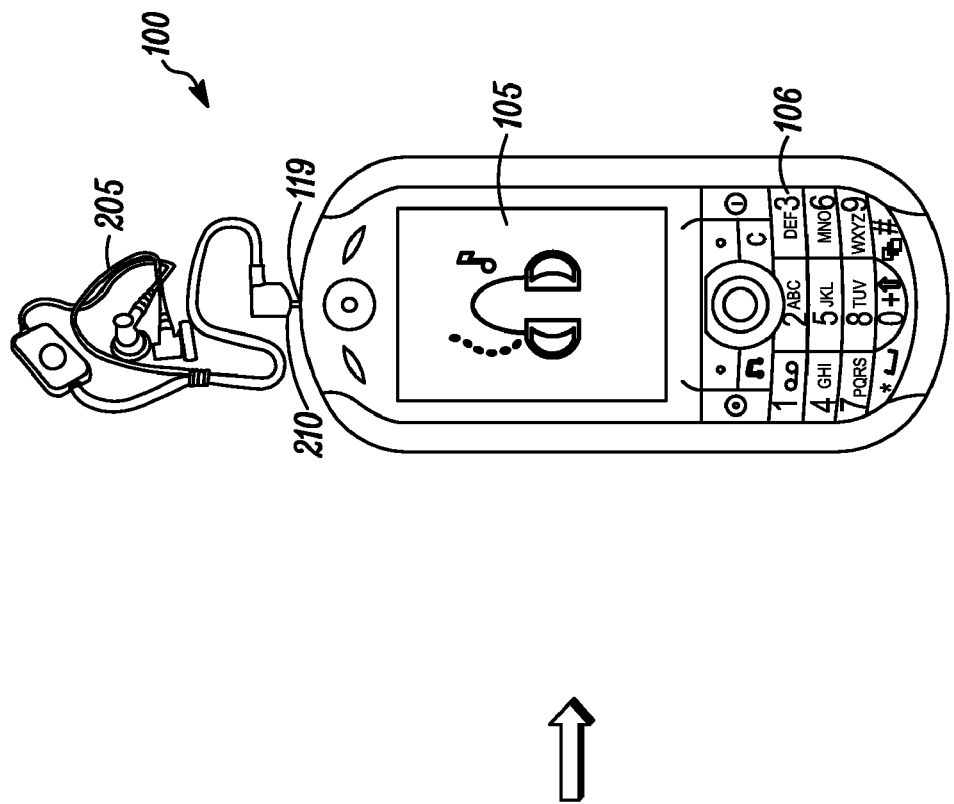
FIG. 2 is a diagram illustrating activation of a media player on a mobile telephone in response to detecting operative coupling of a speaker system, in the form of a headset, to the mobile telephone, according to some embodiments of the present invention.
Figure 2:
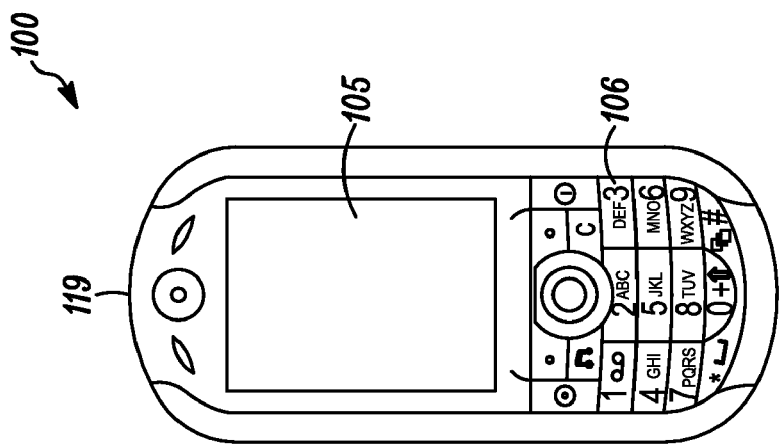

Referring to FIG. 2, a diagram illustrates activating a media player on the mobile telephone 100 in response to detecting the operative coupling of a speaker system, in the form of a headset 205, to the mobile telephone 100 using the peripheral socket 119, according to some embodiments of the present invention. The left side of FIG. 2 illustrates the mobile telephone 100 turned off so that it is not operatively coupled to a network, and shows the display screen 105 as blank. Also, the left side of FIG. 2 shows that no peripheral device is attached to the peripheral socket 119. The right side of FIG. 2 then illustrates the mobile telephone 100 activating a media player automatically in response to detecting a headset plug 210 of the headset 205 being placed into the peripheral socket 119, where the display screen 105 displays icons associated with activation of the media player.

Operative coupling of a speaker system to a wireless communication device can be performed in various ways, according to various embodiments of the present invention. For example, as illustrated in FIG. 2, such operative coupling can comprise insertion of a speaker system plug, such as the headset plug 210, into a socket, such as the peripheral socket 119, of a wireless communication device. According to another embodiment of the present invention, such operative coupling can comprise processing a signal received from a wireless peripheral device. For example, a signal received from a wireless Bluetooth® headset could be processed using the wireless peripheral adapter 121 of the mobile telephone 100. Still other types of operative coupling can include, for example, placing the mobile telephone 100 in a docking station of a home stereo speaker system. Thus according to such an embodiment a song file stored in a memory of the mobile telephone 100 can be immediately played using a home stereo speaker system with few or no commands from a user.

According to other embodiments of the present invention, activating a media player automatically in response to detecting operative coupling of a speaker system to a wireless communication device can be performed using various modes of a wireless communication device. For example, a media player can be activated using a transmitter off mode or "airplane mode" as described above, which enables the media player to be activated more quickly. Alternatively, the media player can be activated using a conventional operating mode where a wireless communication device attaches to a network using a standard start up procedure. A user can then activate a communication mode, such as a communication mode associated with answering an incoming telephone call, by providing an input such as pressing an answer key on the wireless communication device.

According to still other embodiments of the present invention, a wireless communication device can detect operative coupling of a stereo speaker system to the device, and then activate a media player automatically in response to detecting the operative coupling of the stereo speaker system. According to such embodiments, if a mono speaker system is operatively coupled to a device, then the device will not activate the media player. For example, a stereo headset may be generally used to listen to music using a music player of the mobile telephone 100; whereas a mono headset may be generally used with the mobile telephone 100 for telephony communications. If the mobile telephone 100 is either turned off or turned on, in either an airplane mode or a standard operating mode, insertion of a stereo headset plug into the peripheral socket 119 can, according to an embodiment of the present invention, activate a media player automatically in response to detecting the insertion of the stereo headset plug. However, if the mobile telephone 100 is either turned off or turned on, in either an airplane mode or a standard operating mode, insertion of a mono headset plug into the peripheral socket 119 will not, according to an embodiment of the present invention, activate a media player automatically.

Figure 3:
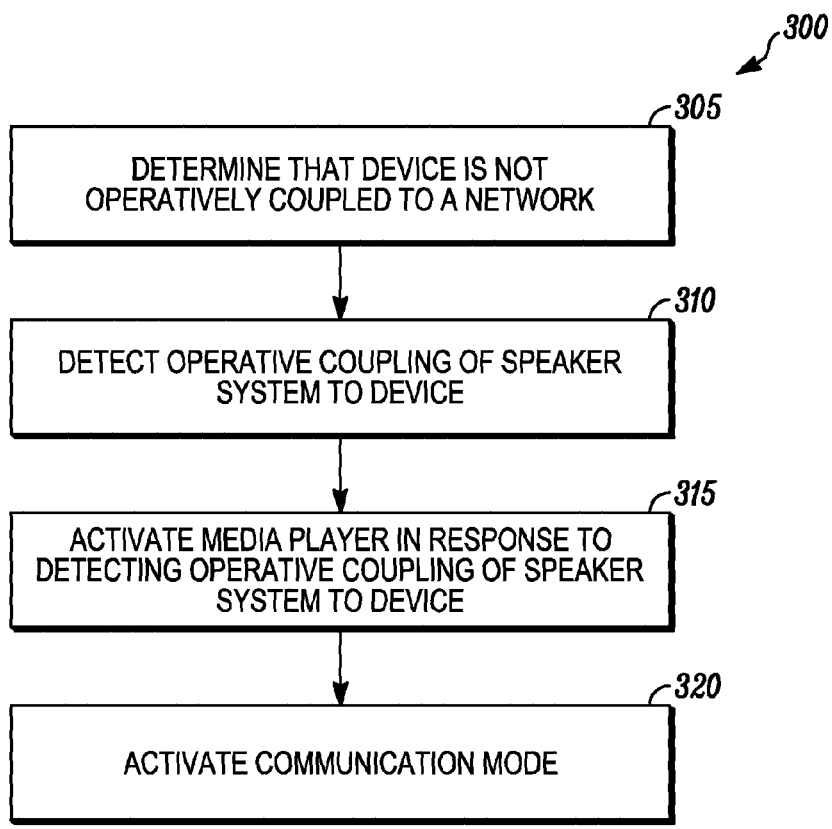
FIG. 3 is a general flow diagram illustrating a method for activating a media player of a wireless communication device, according to some embodiments of the present invention.

Referring to FIG. 3, a general flow diagram illustrates a method 300 for activating a media player of a wireless communication device, according to some embodiments of the present invention. At block 305, it is determined that the wireless communication device is not operatively coupled to a network. For example, it is determined that the mobile telephone 100 is turned off or is operating in a transmitter off or airplane mode. At block 310, an operative coupling of a speaker system to the wireless communication device is detected. For example, insertion of the headset plug 210 into the peripheral socket 119 of the mobile telephone 100 is detected. As will be understood by those skilled in the art, such detection can be performed in various ways such as using physical switches or by processing various electronic signals associated with such an operative coupling. At block 315, the media player is activated automatically in response to detecting the operative coupling of the speaker system to the wireless communication device. For example, a music player or video player of the mobile telephone 100 can be activated automatically in response to insertion of the headset plug 210 into the peripheral socket 119. Further, according to some embodiments of the present invention, the media player can automatically begin playing a preselected audio or video file without any further input from a user other than operative coupling of the speaker system to the wireless communication device. At block 320, a communication mode of the wireless communication device is activated, after activating the media player, by processing an input from a user. For example, a user may choose to place an outgoing call or accept an incoming call to the mobile telephone 100, after having activated a media player, by pressing a key on the keypad 106.

Figure 4:
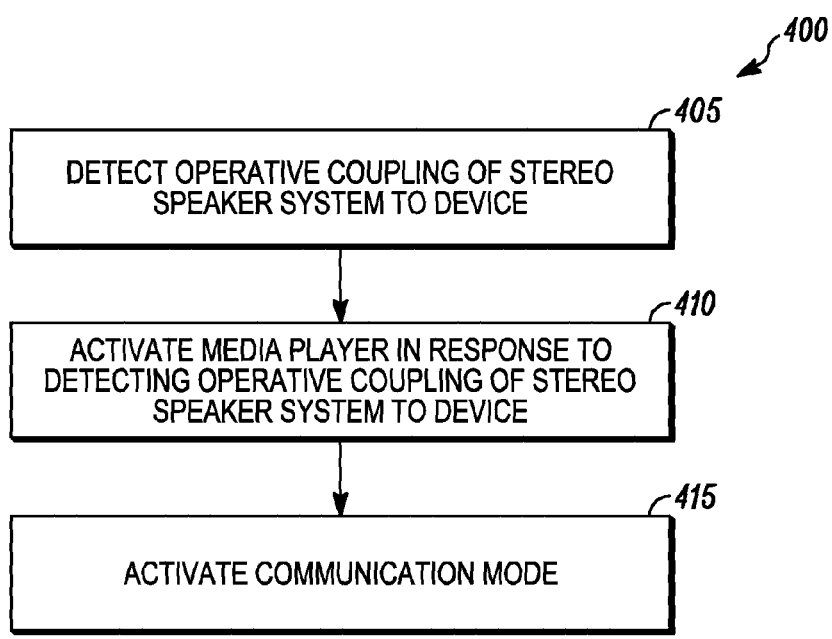
FIG. 4 is a general flow diagram illustrating a method for activating a media player of a wireless communication device, according to some other embodiments of the present invention.

Referring to FIG. 4, a general flow diagram illustrates a method 400 for activating a media player of a wireless communication device, according to some other embodiments of the present invention. At block 405, operative coupling of a stereo speaker system to the wireless communication device is detected. For example, it is detected that a stereo headset plug is inserted into the peripheral socket 119 of the mobile telephone 100. At block 410, a media player is activated automatically in response to detecting the operative coupling of the stereo speaker system to the wireless communication device. For example, a media player of the mobile telephone 100 is activated automatically in response to detecting insertion of a stereo headset plug into the peripheral socket 119 of the mobile telephone 100, whereas insertion of a mono headset plug into the peripheral socket 119 would not activate the media player. At block 415, a communication mode of the wireless communication device is activated, after activating the media player, by processing an input from a user. For example, a user may choose to place an outgoing call or accept an incoming call to the mobile telephone 100, after having activated a media player, by pressing a key on the keypad 106.

Embodiments of the present invention therefore enable a media player of a wireless communication device to be activated quickly and with only a single input from a user. Operative coupling of a speaker system to a wireless communication device, such as the single action of plugging in a headset to a mobile telephone, can automatically activate a media player to provide immediate access to audio or video files. Some embodiments of the present invention further avoid delays associated with attaching a wireless communication device to a network during a conventional start up process, by activating a media player in a transmitter off mode, thus further accelerating access to the media player and conserving battery power. Still other embodiments of the present invention distinguish between operative coupling of a stereo speaker system, which may indicate that a user seeks to play an audio or video file using a media player, and operative coupling of a mono speaker system, which may indicate that a user seeks to use a wireless communication mode of a wireless communication device.

It will be appreciated that embodiments of the invention described herein may be comprised of one or more conventional processors and unique stored program instructions that control the one or more processors to implement, in conjunction with certain non-processor circuits, some, most, or all of the functions of activating a media player of a wireless communication device as described herein. The non-processor circuits may include, but are not limited to, a radio receiver, a radio transmitter, signal drivers, clock circuits, power source circuits, and user input devices. As such, these functions may be interpreted as steps of a method for activating a media player of a wireless communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

I claim:

1. A method for activating a media player of a wireless communication device, the method comprising:
   determining that the wireless communication device is not operatively coupled to a network;
   detecting an operative coupling of a speaker system to the wireless communication device; and
   in response to detecting the operative coupling of the speaker system to the wireless communication device and also responsive to determining that the wireless communication device is not operatively coupled to the network, automatically activating the media player to begin playing an audio or video file using the speaker system.

2. The method of claim 1, wherein the operative coupling of the speaker system to the wireless communication device comprises insertion of a speaker system plug into a socket of the wireless communication device.

3. The method of claim 1, wherein the speaker system comprises a headset.

4. The method of claim 1, wherein the media player comprises an audio or video player.

5. The method of claim 1, wherein the operative coupling of the speaker system to the wireless communication device comprises processing a signal received from a wireless peripheral device.

6. The method of claim 5, wherein the wireless peripheral device comprises a wireless headset.

7. The method of claim 1, further comprising activating a communication mode of the wireless communication device, after activating the media player, by processing an input from a user.

8. The method of claim 1, wherein the audio or video file comprises a preselected audio or video file.

9. The method of claim 1, wherein the wireless communication device is a mobile telephone, and determining that the wireless communication device is not operatively coupled to a network comprises determining that the mobile telephone is turned off.

10. The method of claim 1, wherein activating the media player is performed in a transmitter off mode that does not operatively couple the wireless communication device to the network.

11. A wireless communication device comprising:
   a microprocessor; and
   a programmable memory operatively coupled to the microprocessor, wherein the programmable memory comprises:
      computer readable program code components for determining that the wireless communication device is not operatively coupled to a network;
      computer readable program code components for detecting an operative coupling of a speaker system to the wireless communication device; and
      computer readable program code components for responsive to detecting the operative coupling of the speaker system to the wireless communication device and also responsive to determining that the wireless communication device is not operatively coupled to the network, automatically activating a media player to begin playing an audio or video file using the speaker system.

12. The wireless communication device of claim 11, further including a socket, and wherein the operative coupling of the speaker system to the wireless communication device comprises insertion of a speaker system plug into the socket of the wireless communication device.

* * * * *